Oct. 14, 1952  A. G. DEAN  2,613,617
WEATHER SEAL FOR CLOSURES
Filed Aug. 18, 1949  2 SHEETS—SHEET 1
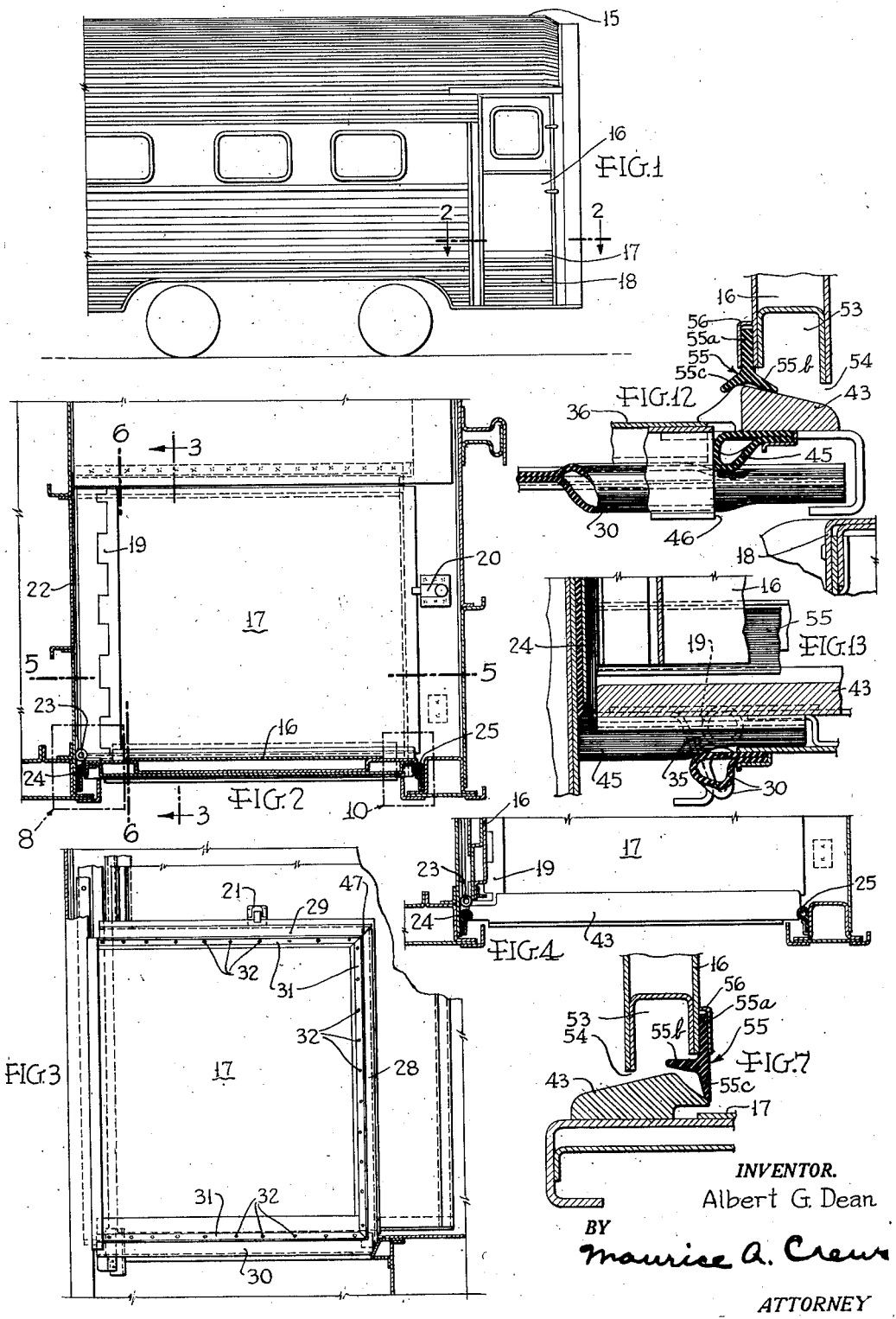
INVENTOR.
Albert G. Dean
BY Maurice A. Crews
ATTORNEY

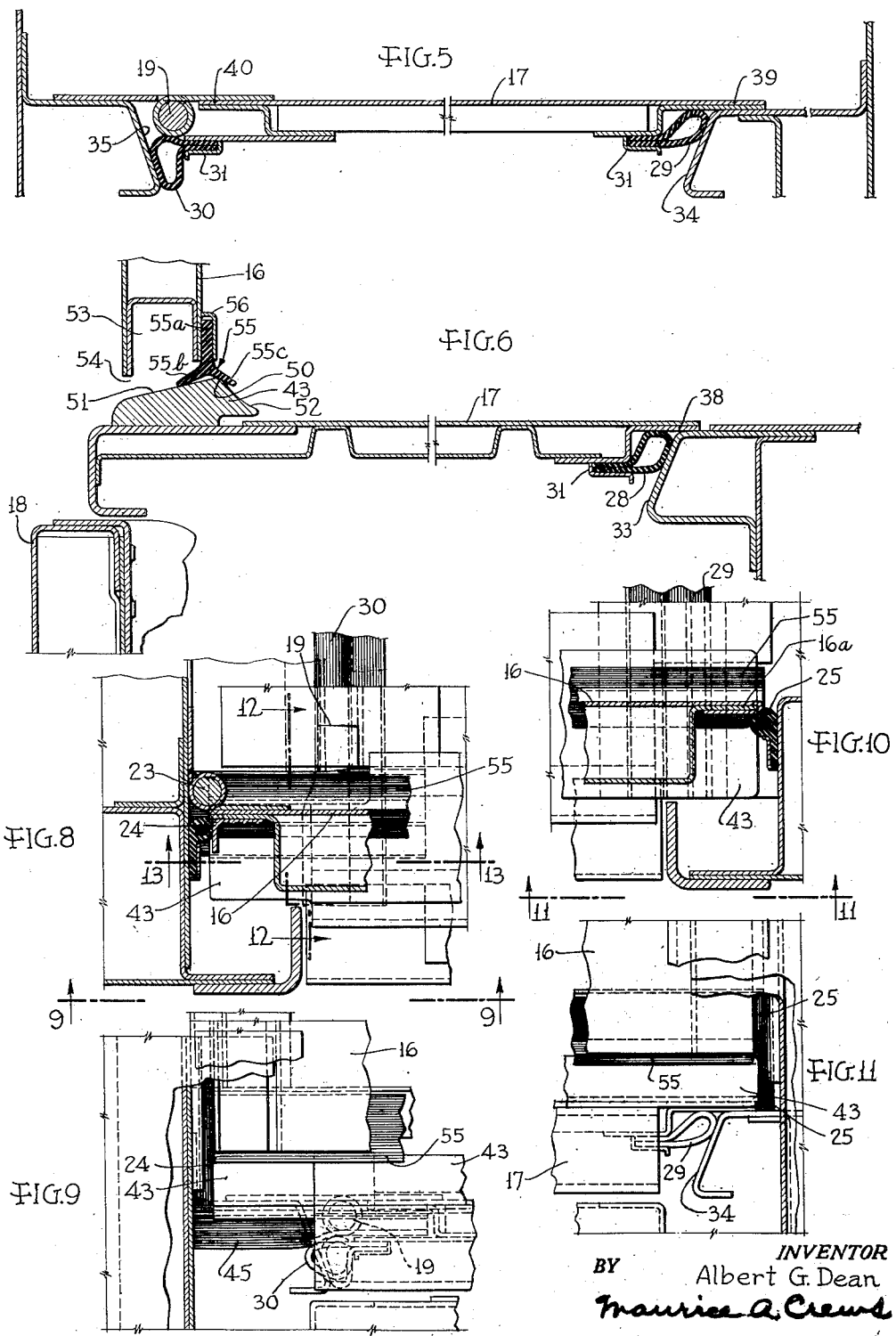

Patented Oct. 14, 1952

2,613,617

UNITED STATES PATENT OFFICE 2,613,617

WEATHER SEAL FOR CLOSURES

Albert G. Dean, Narberth, Pa., assignor to The Budd Company, Philadelphia, Pa., a corporation of Pennsylvania Application August 18, 1949, Serial No. 111,011

4 Claims. (Cl. 105—429)

This invention relates to weather seals for closures, particularly as applied to the closures of a vehicle vestibule having side and trapdoors, and has for an object the provision of improvements in this art.

One of the particular objects of the invention is to provide complete weatherstripping for a side door and a trapdoor which have inter-related parts when closed.

Another object is to provide weatherstripping for such closures which will give the best possible seal and yet have the least possible wear.

Another object is to provide weatherstripping of an effective character for an extension which is provided behind the hinge line of a trapdoor for cooperating with a portion of a vestibule side door to fully seal the vestibule space on the side and bottom.

Another object is to provide an improved weather strip adapted for forming a tight weather seal and water shed, as for the bottom of a closure.

Another object is to provide a weather seal for a trapdoor which causes the load on the trapdoor to be carried on strong structural parts while causing the weather strip to be relieved of all loads except that required to form the weather seal.

A preferred embodiment of the invention is illustrated in the accompanying drawings, wherein:

Fig. 1 is a side elevation of one end of a rail car having end vestibule closures sealed in accordance with the present invention;

Fig. 2 is a plan view taken about on the line 2—2 of Fig. 1, showing the vestibule floor and trapdoor, with the side door and other parts shown in section, both doors being fully closed to seal the vestibule space;

Fig. 3 is an inside elevation and transverse section taken about on the line 3—3 of Fig. 2 but showing both the side door and the trapdoor in open positions;

Fig. 4 is a horizontal section taken on the same line as Fig. 2 but showing the side door open and the trapdoor closed;

Fig. 5 is an enlarged vertical section taken on the line 5—5 of Fig. 2;

Fig. 6 is an enlarged vertical section taken on the line 6—6 of Fig. 2;

Fig. 7 is a partial section taken on the same line as Fig. 6 but showing the side door just before it reaches its fully closed position;

Fig. 8 is a partial enlarged horizontal section showing parts in the area 8 of Fig. 2;

Fig. 9 is an elevation and section taken on the line 9—9 of Fig. 8;

Fig. 10 is a partial enlarged horizontal section showing parts in the area 10 of Fig. 2;

Fig. 11 is an elevation and section taken on the line 11—11 of Fig. 10;

Fig. 12 is a vertical section taken on the line 12—12 of Fig. 8; and

Fig. 13 is a vertical section taken on the line 13—13 of Fig. 8.

It has for a long time been desirable and usual to seal as many openings as possible on passenger vehicles to exclude cold air, rain, snow, dust and the like. In recent years this has become more important as rail cars, particularly, have come to be more commonly air conditioned. It may be desirable to pressurize the car interior or vestibule, or both, to more positively exclude dust, etc., and the more effective is the seal at openings in the vestibule, the easier it is to prevent excessive outward air leakage and to maintain the interior air pressure. The car ends around the vestibule and steps are particularly difficult to seal because of the manner in which air currents swirl around and even upward about the ends of the car. The present invention provides a tight seal between the trapdoor and its frame in the floor, between the side door and its frame, and between the trapdoor and the side door. If, in addition, the space below the trapdoor, referred to as the stepwell, is also enclosed or both enclosed and sealed, the interior vestibule space will be made more secure, but the present invention provides an adequate seal for the vestibule space, whether or not the stepwell is enclosed or sealed.

Referring to the drawings, and first to Fig. 1, a car 15 having an end vestibule is provided with a side vestibule door 16 above a trapdoor 17, the outer edge only of which can be seen in Fig. 1. In the illustrated arrangement the stepwell space is closed beneath by the steps (not shown) and on the outer side by a cover and fairing panel 18 when the parts are in non-loading or running condition. Also, in the present form, the door is made in two parts, lower and upper, and provided on the top, side, and intermediate joint portions with weather excluding and sealing means of the type disclosed in my co-pending application, Serial No. 69,856, filed January 8, 1949.

In Fig. 2 the trapdoor 17 is shown in closed position, having been swung down about its interfingered piano-type hinge mounting 19 and being held down in closed position by a latch 20. In Fig. 3 the trapdoor is shown in raised position where it is held by a latch 21 carried by the lower panel of the side door 16, the side door being first swung back against the inside end vestibule wall 2. The side door hinge 23, as shown in Fig. 2, is located nearer the wall 22 than the trapdoor hinge 19 whereby the proper operation of these doors relative to each other may be effected. The side edge weatherstrips 24 and 25 for the side door are also shown in Fig. 2.

On its under side, Fig. 3, the trapdoor 17 on three sides is provided with weather stripping, a strip 28 on the inner edge, a strip 29 on the front edge, and a strip 30 on the rear or hinge edge. As shown in Figs. 5 and 6, the weatherstripping is of a bulbous type, for example a folded rubber strip, secured along a flat portion thereof by a metal strip 31 and screws 32. These strips 28, 29 and 30 engage inwardly tapered sides 33, 34 and 35 respectively of the frame of the vestibule floor 36 with which the trapdoor cooperates.

The strips are disposed beneath adjacent parts which cause them to be pressed against the tapered frame sides but without imposing the weight of the trapdoor and its loading on the weatherstrips, the door being supported when lowered by its projecting flanges 38 and 39, which rest on the floor, and flange element 40 which is supported by the hinge 19. The strip 28 is pushed down by the flange 38, the strip 29 by the flange 39, and the strip 30 by being forced beneath the hinge 19.

No weatherstripping is shown for the outer bottom edge of the trapdoor, that being a matter dealt with in connection with the stepwell closure panel 18. As stated above, the sealing means hereby provided completely closes this part of the vestibule space which serves the passengers' use and whether or not the stepwell is sealed will depend on the desirability or necessity for keeping dust, snow, rain or the like out of the stepwell, a matter relating to the operability and cleanliness of the steps and related parts when required for passenger use.

The trapdoor 17 on its upper surface and at its outer edge carries a threshold strip 43 which is approximately as long as the width of the side door 16 at the widest flange portions 16a of the door, as shown in Figs. 2, 8, 9, 10, 11 and 13, whereby the ends of the threshold strip press against and form a seal with the door side weatherstrips 24 and 25 when the trapdoor is closed, as shown especially in Figs. 4, 9, 11 and 13. Since the side door extends further on the hinge side toward the inner end vestibule wall and folds behind the trapdoor, an extension behind the hinge axis is provided on the trapdoor beneath the side door, the extension in the present case being provided by the threshold strip 43 itself.

As shown in Figs. 12 and 13, a piece of weatherstripping 45 is secured beneath this rearward extension in a position to rub on its side along a vertical frame face 46 and to have its end rub along the side of the door frame between the face 46 and the side weatherstrip 24 of the side door. As shown in Fig. 9, the weatherstrip 24 partly abuts the strip 45 when the latter is moved up by the closing of the trapdoor. Also, as shown in Figs. 12 and 13, the rear weatherstrip 30 of the trapdoor extends across and seals with the weatherstrip 45. It is thus seen that the seal at this corner projection is complete and continuous with the weather seal on the adjacent rear side of the trapdoor.

The joint details of the weatherstripping shown in Fig. 3 should be noted. At the inner front corner between the strips 28 and 29, where the tapered frame sides push both inward and upward on the two strips by about the same amount, a mitered joint is provided with an edge of one piece tucked into the hollow of the other piece, as shown at the dotted portion 47; and at the inner rear corner where the inner edge strip 28 is pushed inward and upward and the rear edge strip 30 is pushed inward and downward, an overlapped joint is provided to allow the ends of the two strips to engage adjacent tapered walls and form a tight corner seal in spite of the fact that the two strips may be at different levels when the trapdoor is closed.

The seal for the bottom edge of the side door above the threshold 43 provides a good water shed as well as a seal. As shown in Fig. 6, the threshold 43 includes an elevated obtuse corner element 50 having an outwardly sloping upper surface 51 and an inwardly sloping inner surface 52. The bottom of the door has a hollow space 53 with a narrow outer slot 54 between door and sill to kill the velocity of entering air; and on the inner side of the hollow space above the drip line of water, the door is provided with a weatherstrip 55. This general arrangement is shown in the application referred to above. The weatherstrip itself and its action are new over the application.

The strip 55 is Y-shaped in cross-section and is mounted in an inverted position, as by securing its stem 55a to the inside surface of the door by a clamp strip 56. The V-shaped portion, which includes the outer leg 55b and the inner leg 55c, is adapted to straddle the obtuse angular portion 50 when the door is closed, the outer leg 55b forming principally a water shed which may or may not engage closely the sloping surface 51. The relationship between door and threshold may be such that the leg 55b does engage the surface 51 tightly, in which case a double seal is provided. The arrangement is such that in any event a tight seal will be provided between the inner leg 55c and the upper surface 50. The leg 55b in the case of a double seal still serves as a water shed to drain water away from the primary seal.

In Fig. 7 the strip 55 is shown in an approach position. Here, due to the curved configuration of the rubber strip, the outer leg 55b normally stands in approximately horizontal position and at a higher elevation than the inner leg 55c so that it moves over and past the corner 50. Then the inner leg comes against the inner threshold surface 52 and the continued closing movement of the door causes the outer leg 55b to be forced down toward the upper outer surface 51 to form a water shed, and if forced down enough to form a water seal as well as a water shed, as explained. The ends of the Y-shaped strip 55 wedge between the side strips 24 and 25 when the side door is closed.

In action, starting with both the side door and trapdoor in open position, the trapdoor is first closed and latched, the weatherstripping on the inner and front sides being engaged with the tapered inner and front frame walls in this action and the rear weatherstripping being engaged with the tapered rear wall. The flanges 38 and 39 push the weatherstrips 28 and 29 down and the hinge 19 causes the rear weatherstrip 30 to move down. The corner joints and the extension weatherstripping maintain a tight seal all around except on top of the trapdoor. The flanges 38 and 39 come to rest on the floor and, together with the hinge 19 take the weight of the trapdoor and all the load that may be imposed upon it, the weatherstripping taking none of this load and consequently having no damage in use from such loading.

The side door is now closed to seal all sides, top, and bottom by the weatherstripping provided. It has already been seen how the Y-shaped bottom weatherstrip 55 engages the threshold strip and forms a seal and water shed when the side door is closed.

While one embodiment is disclosed in detail, it is to be understood that there may be other embodiments within the spirit of the invention.

What is claimed is:

1. Closure weatherproofing for a side door and trapdoor of a vestibule, comprising in combination, a side door hinged at the inner end vestibule wall, a trapdoor hinged forwardly of the side door hinge line whereby to swing up in front of the side door and to swing down below it, weatherstripping on the frame for the sides of the side door and extending below the trapdoor, weatherstripping on the inner side, front side, and rear hinge side of the trapdoor, a threshold on the top surface of the trapdoor beneath the side door when closed, the threshold having a projecting end extending behind the hinge line of the trapdoor, the ends of said threshold engaging the door side weatherstripping when the trapdoor is closed, weatherstripping on the bottom of the side door cooperating with said threshold to form an air and water excluding seal therewith, the weatherstripping on the bottom of the door engaging and forming a seal at its ends with the weatherstripping for the sides of the side door, and weatherstripping on the side of the projecting rear end of the threshold cooperating and sealing with a mating fixed side surface behind the hinge line and at the end with the side weatherstripping for the hinge side of the side door.

2. Closure weatherproofing for a first vertically hinged closure and a second horizontally hinged closure positioned below the first closure, the horizontal hinge axis of the second closure being located in front of and being disposed transversely relative to the vertical hinge axis of the second closure, the second closure being adapted to swing up in front of the first closure when both are opened, weatherstripping for the first closure including side strips secured to its frame and extending below the second closure, weatherstripping for the lower side of the second closure on its sides other than the side beneath the first closure, a raised element in the nature of a threshold on the upper surface of said second closure, weatherstripping on the bottom of said first closure cooperating with said raised element and at its ends engaging the weatherstripping for the sides of the first closure, the second closure having an extension rearwardly of its hinge line, the ends of said raised element of the second closure engaging the side weatherstripping of the first closure when the second closure is closed, and weatherstripping on the side of said extension cooperating with a mating fixed side surface behind the hinge line of the second closure, the weatherstripping for the rear or hinge side of said first closure making sealing engagement between the weatherstripping on the bottom of the first closure and weatherstripping of said second closure.

3. Closure weatherproofing construction as set forth in claim 2, further characterized by the fact that said weatherstripping on said rearward extension has a sliding movement along an adjacent vertical side wall.

4. Closure weatherproofing for the side door and trapdoor of a vehicle vestibule, comprising in combination a side door hinged at the outer side of the vestibule, a trapdoor hinged inside the hinge line of the side door whereby to swing up in front of the side door and to swing down below it, weatherstripping on the frame for the sides of the side door, weatherstripping for the bottom surface edges of the trapdoor on the inner, hinge and closing edges, a raised strip in the nature of a threshold on the top surface of the trapdoor at the outer edge, and weatherstripping on the bottom of said side door, said bottom weatherstripping being Y-shaped with the stem upward and the legs of the V-portion downward, one leg standing above the raised strip before the side door is closed and being moved down toward the strip as the door closes, the bottom weatherstripping of the side door at its outer edge at the ends engaging the door side weatherstripping when the trapdoor and side door are closed.

ALBERT G. DEAN.

REFERENCES CITED

The following references are of record in the file of this patent:

UNITED STATES PATENTS

| Number | Name | Date |
|---|---|---|
| 1,928,602 | Mussey et al. | Sept. 26, 1933 |
| 2,059,674 | Wood et al. | Nov. 3, 1936 |
| 2,108,137 | Oftedal et al. | Feb. 15, 1938 |
| 2,167,958 | Oftedal et al. | Aug. 1, 1939 |
| 2,220,035 | Brack | Oct. 29, 1940 |
| 2,379,193 | Shields | June 26, 1945 |
| 2,421,400 | Young | June 3, 1947 |
| 2,546,626 | Beezhold | Mar. 27, 1951 |
| 2,549,284 | Baker | Apr. 17, 1951 |

FOREIGN PATENTS

| Number | Country | Date |
|---|---|---|
| 581,038 | Germany | July 20, 1933 |
| 794,152 | France | Dec. 2, 1935 |